BEST AVAILABLE COPY

I. Gay,

Making Sash.

No 8,846 x

Patented May 20, 1835.

AM. PHOTO-LITHO. CO. N.Y. (OSBORNE'S PROCESS)

8846X Ira Gay, of Dunstable N. Hampshire.
Letters Patent.

The Schedule referred to in these Letters Patent and making part of the same containing a description in the words of the said Ira Gay himself of his improvement in a machine for planing sash for Windows.

---

Figure 1:
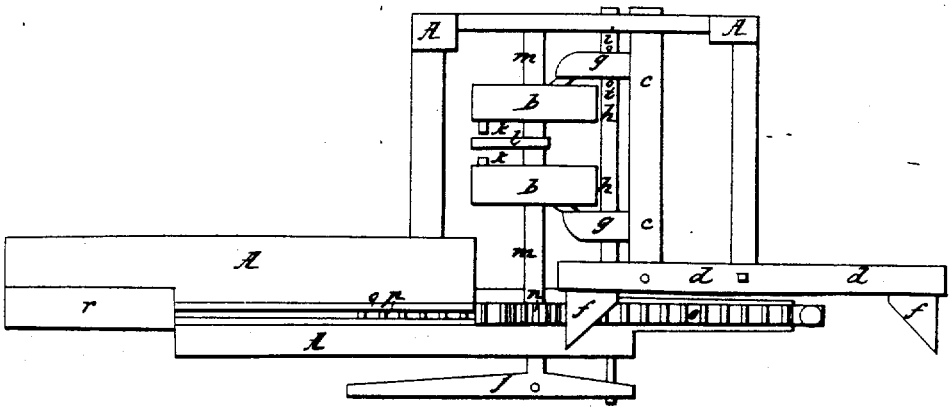
Figure 2:
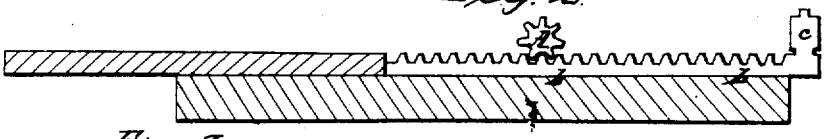
Figure 3:
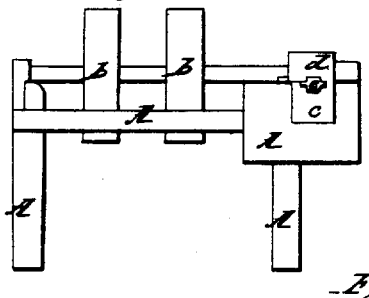

To all to whom, these presents shall come: Be it known that I Ira Gay of Dunstable in the County of Hillsborough and State of New Hampshire, have invented, or combined and constructed, and put in use a machine for planing sash. The object of the machine is to save much labor, and to execute the work in a more workman like manner than it is usually done, and that the following is a full and exact description of the construction and opperation of the said machine as invented or combined by me. A.A.A.A. at fig 1st 3d & 4th represents the frame of the machine bb at fig 1st 2d & 3d are pullies which revolve in opposite directions and are connected so as to operate the machine as follows c.c. fig. 1st is a small slide running cross ways, the machine connected with the lever d.d. which is hung in the centre by the pin e. the lever has an angular piece of wood ff at each end, connected with the slide. c.c. are two small [?] of wood gg which are connected with the wheels by means of a collar, and clamp, and being so connected, both wheels move with the slide cc. hh. is a slide connected with the slide cc by means of two pins ii and running to the lever j. seen at fig. 1st seen also at e. fig 4th the lever may be moved back or forward when the machine is to be put in operation, and as the pullies move back and forward the pins kk fig 1st strike the arm l. connected with the shaft m m. on the shaft at n. is a small pinion seen at A fig 2d at k fig 4th which play in a rack represented at o. fig 1st b fig 2. d fig 3 the rack is fitted in a groove so that it will play back and forward without binding. The strips to be planed are placed between the pin p fig 1st e fig 4th and the plane box r fig 1st f fig 4th the box has a cap 3 fig 4th the shape of the box and cap may be seen at c d fig 5. the cap is held to the box by iron bands passing over it with

Figure 4:
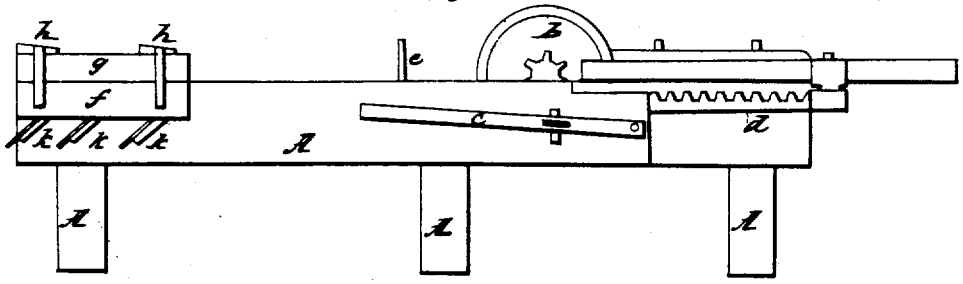

8846X keys, at the top seen at h h fig 4th. When the machine is put in operation the strips to be planed are crowded through the plane box to which is attached any number of planes, generally from twelve to sixteen. the position of the planes may be seen at k k k fig. 4th. It is necessary to have a number of caps according to the shape of the stuff, the finishing cap may be seen at e fig 3d. the rack as it moves back and forward (and is carried back) as before mentioned by the pinion the pulley c fig 2d. strikes the angular pieces f f and crowds the end back which it strikes, and being connected as heretofore mentioned with the pullies they are carried too and from the arm b when one pulley is carried from the other pully is carried up and the shaft is turned in the opposite direction, the rack by which means is carried back until the pully s fig 1st. strikes the angular piece at the other end of the lever & the same operation takes place as before mentioned. The rack moves back and forward while a person is employed in laying the strips to be planed between the pin and plane box when the rack moves up the strips are crowded through the plane box and the planes therein laid give the intended shape of the sash. Having by the foregoing fully described the nature of my invention and the manner in which the same is to be used I do hereby declare that I do not claim any part of said machine, as new in itself but claim the combination of known me-chanical contrivances in such a manner as have not heretofore been used, for the purpose herein described. believing the machine of much greater value than any heretofore in use.

Witnesses
Isaac Spalding
Chs H. Nutt

Ira Gay

Exd
[illegible]

(Drawing)

848 w 5[illegible]